Dec. 8, 1931.  E. A. WATTS  1,835,543
STARTING MECHANISM FOR INTERNAL COMBUSTION ENGINES
Filed Nov. 17, 1924  9 Sheets-Sheet 1
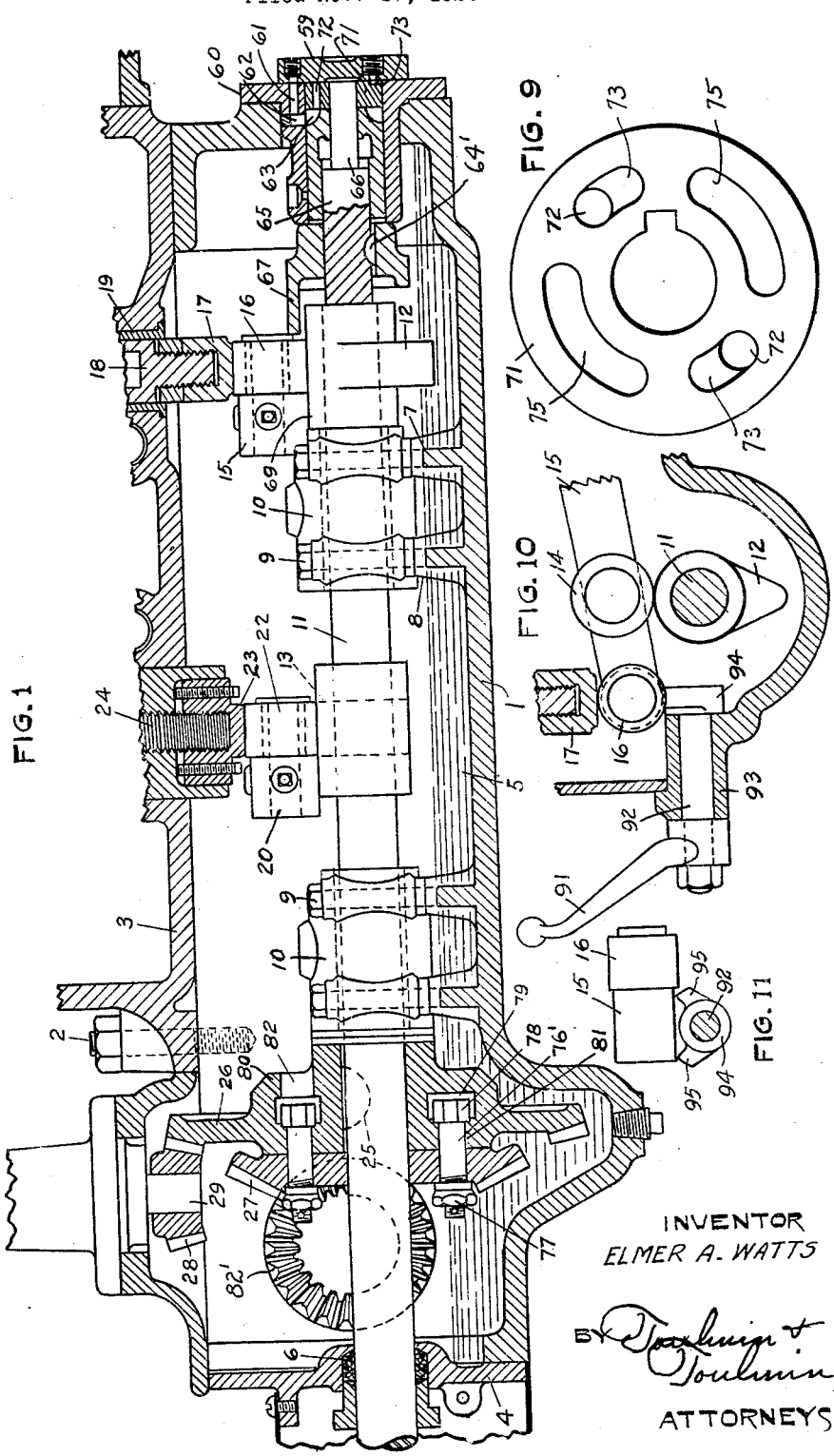
INVENTOR
ELMER A. WATTS
BY Toulmin &
Toulmin,
ATTORNEYS

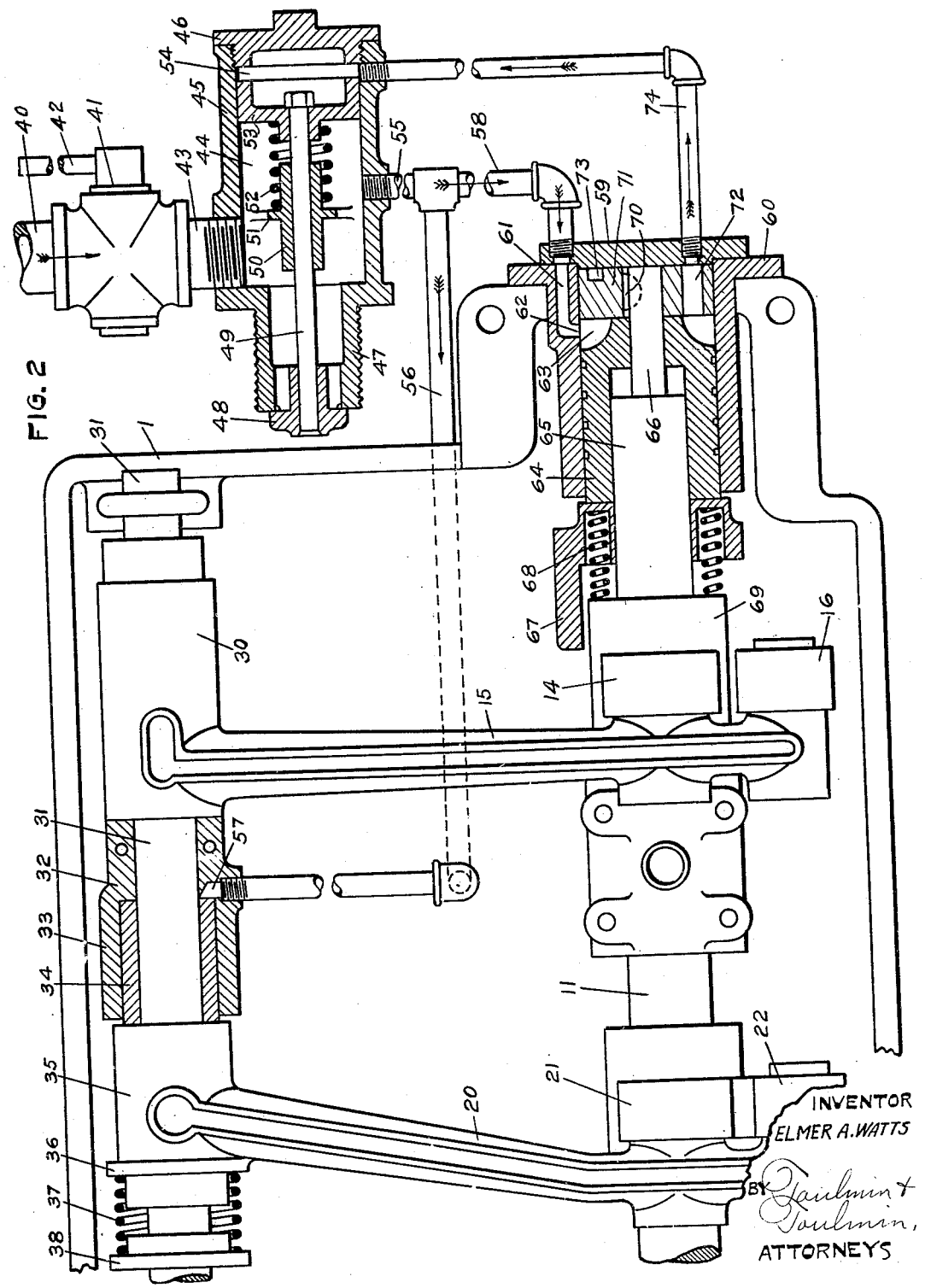

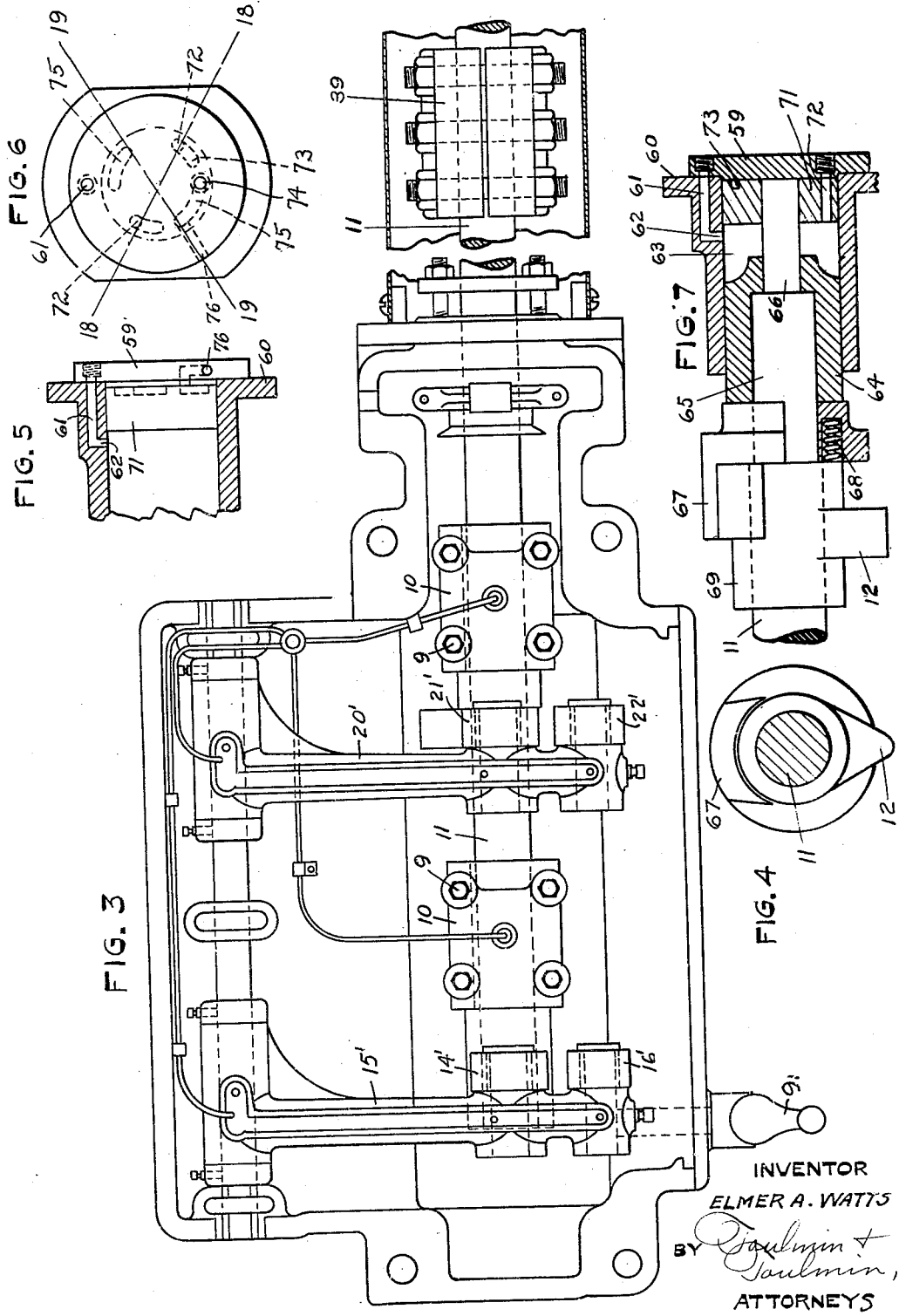

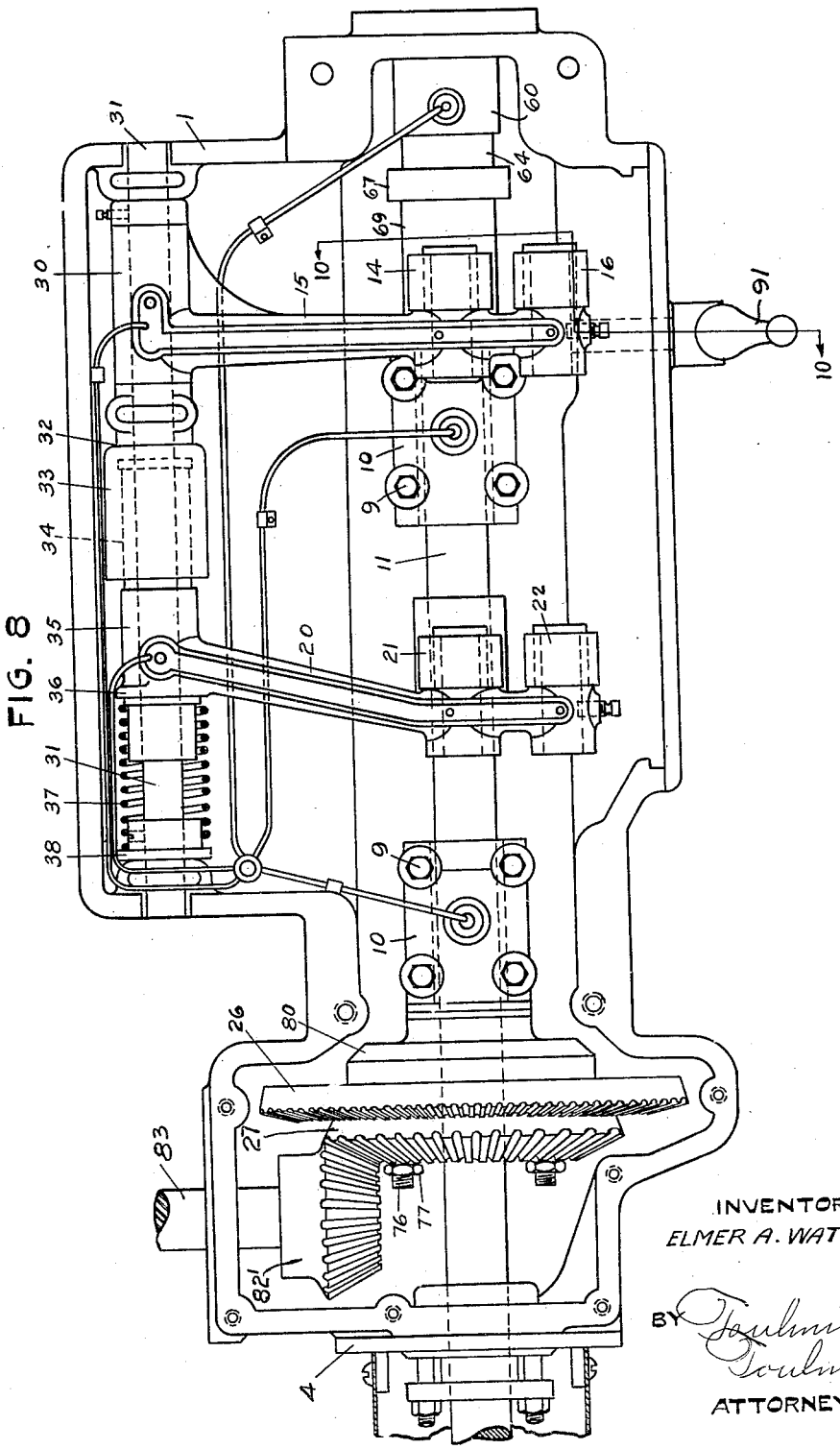

Dec. 8, 1931.   E. A. WATTS   1,835,543
STARTING MECHANISM FOR INTERNAL COMBUSTION ENGINES
Filed Nov. 17, 1924   9 Sheets-Sheet 5
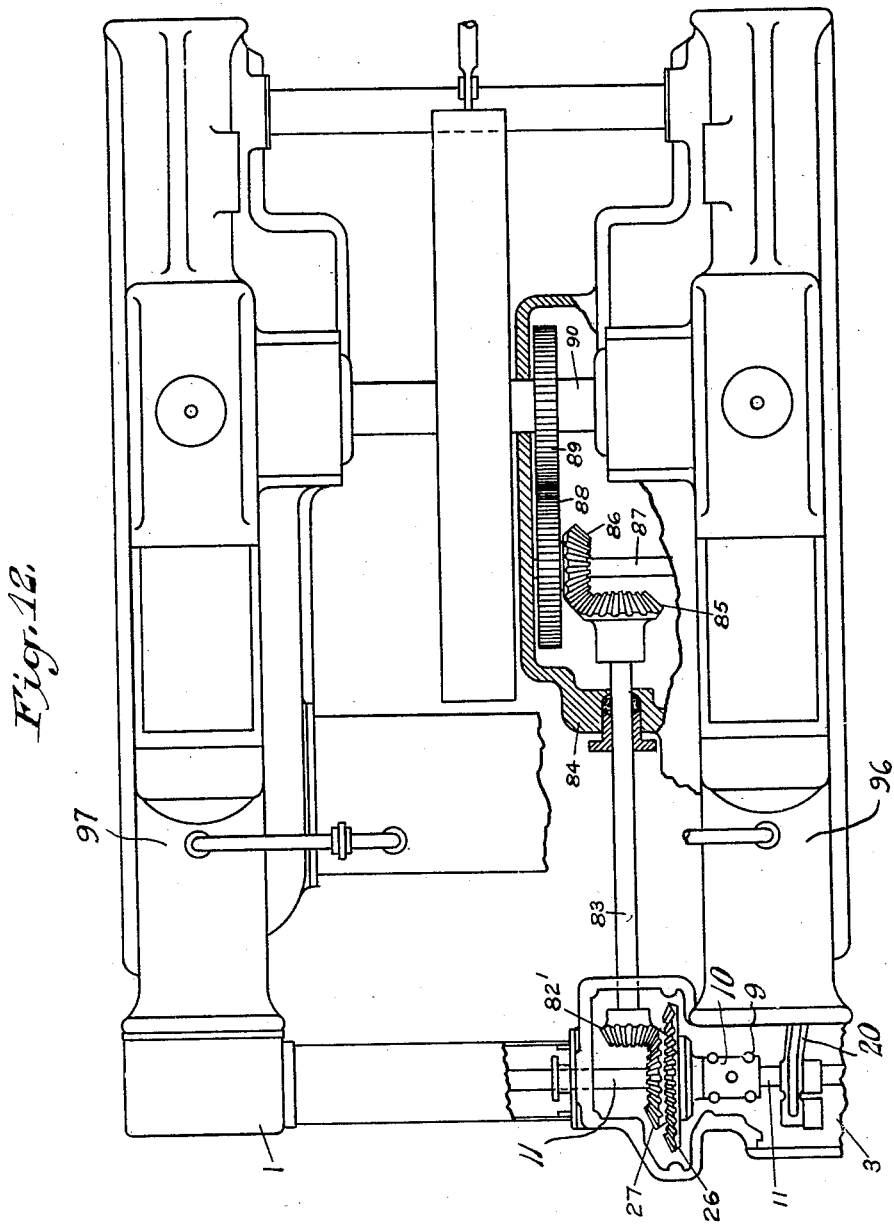
INVENTOR.
ELMER A. WATTS
BY Toulmin Toulmin,
ATTORNEYS.

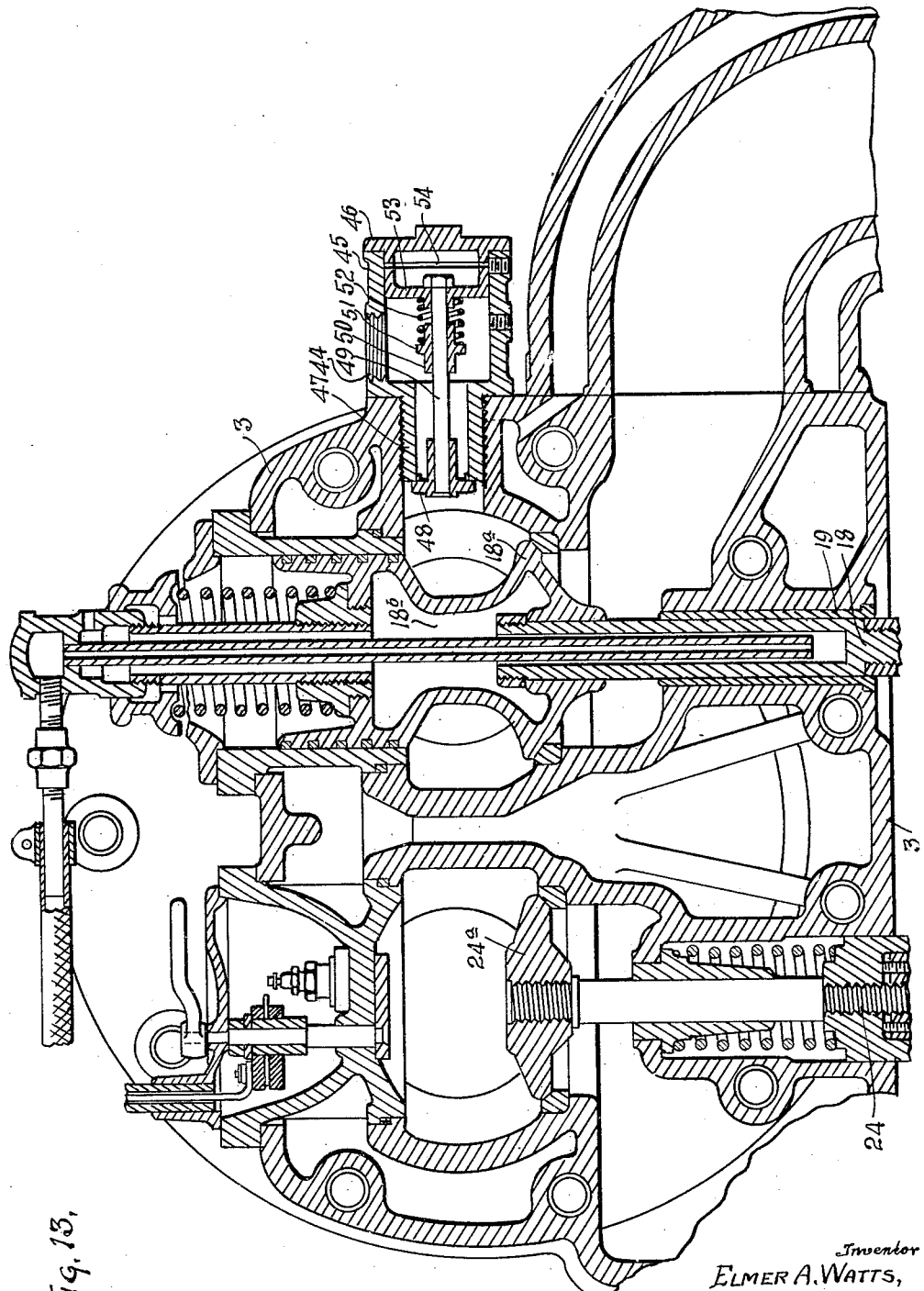

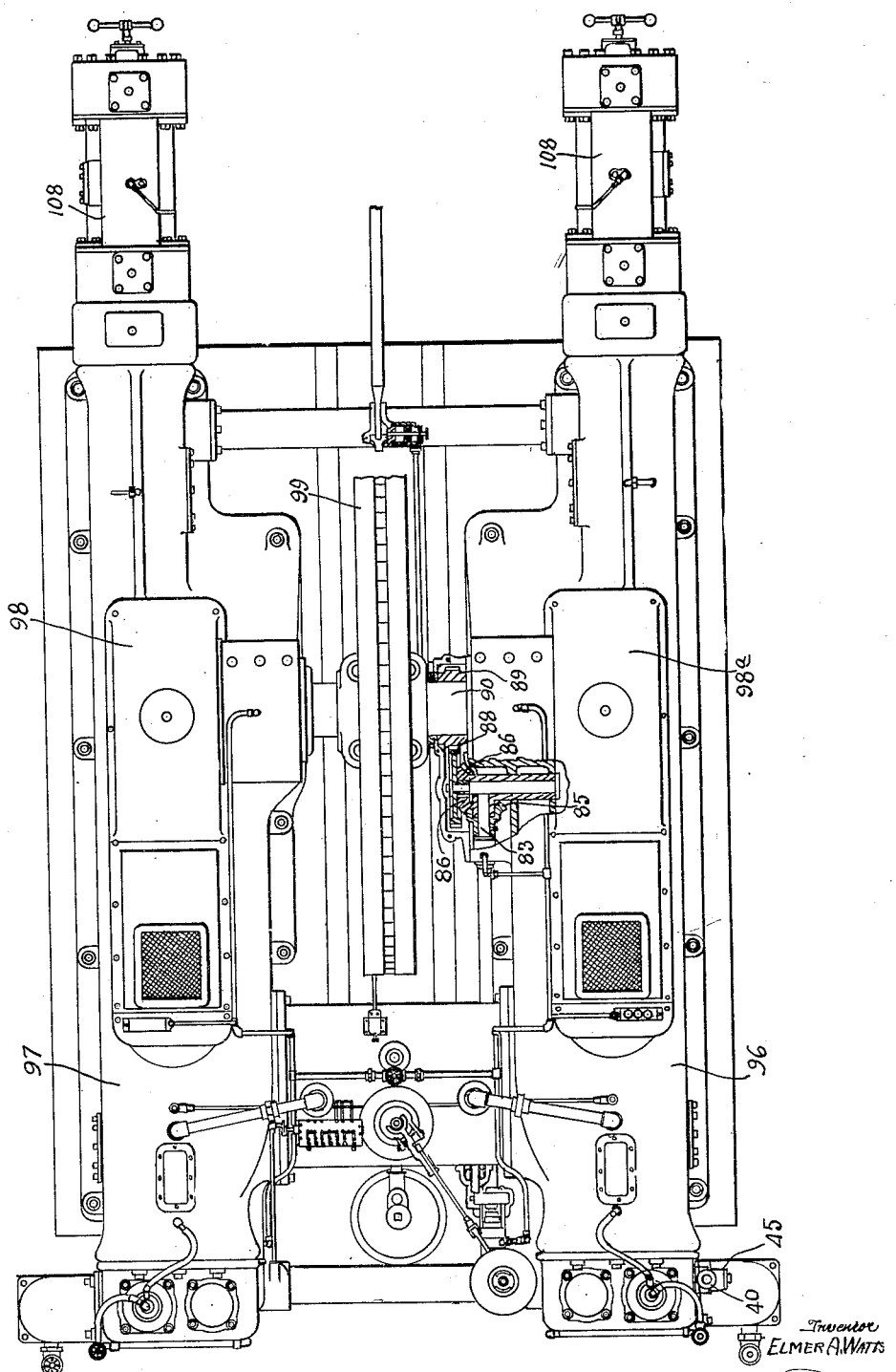

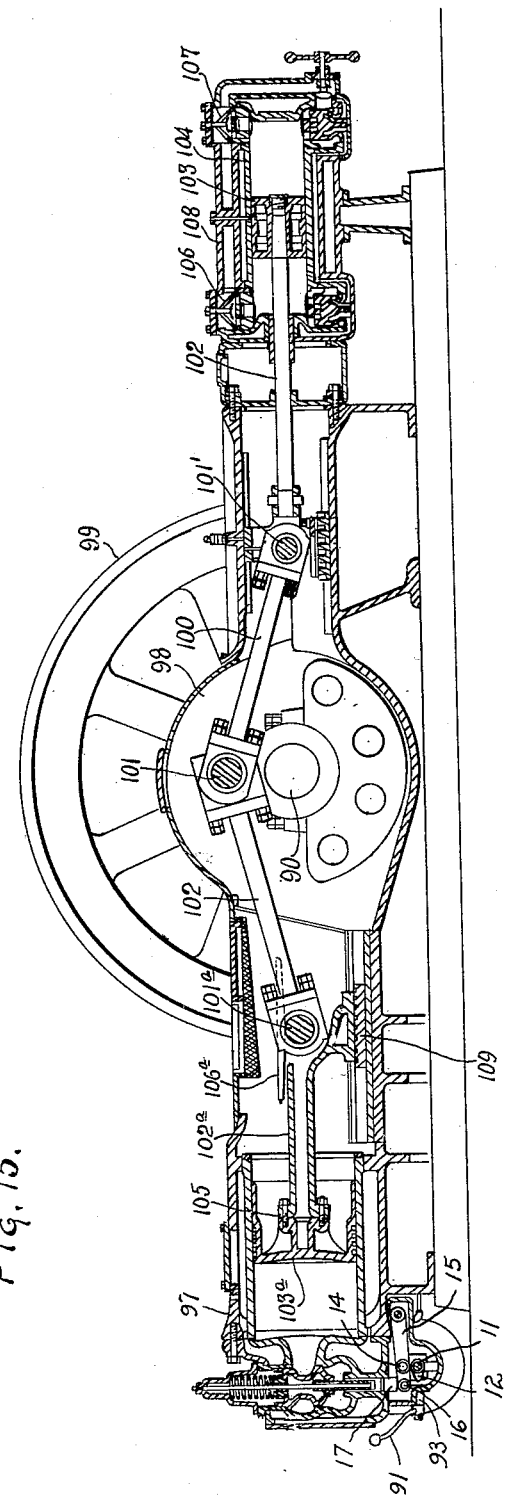

Dec. 8, 1931.  E. A. WATTS  1,835,543
STARTING MECHANISM FOR INTERNAL COMBUSTION ENGINES
Filed Nov. 17, 1924   9 Sheets-Sheet 9

Inventor
ELMER A. WATTS,
By Toulmin Toulmin,
Attorneys

Patented Dec. 8, 1931

1,835,543

UNITED STATES PATENT OFFICE

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO

STARTING MECHANISM FOR INTERNAL COMBUSTION ENGINES

Application filed November 17, 1924. Serial No. 750,467.

My invention relates to internal combustion motors and in particular to a starter or starting mechanism therefor and the valve mechanism of the motor in connection with the starting mechanism.

It is the object of my invention to provide mechanism for controlling the inlet and exhaust valves and the governor shaft of one or more cylinders of an internal combustion motor and in particular in very large motors in which the compressions are so great that starting is difficult.

It is a further object of my invention to provide means of quickly providing for the starting of the motor by rendering the valves inoperative or changing the time of their operation.

It is an object of this invention to provide a starter to be used in connection with internal combustion engines in which there is a plurality of cylinders. This device is applied to one cylinder, and provides means for rendering inoperative the intake valve of said cylinder, and means for further regulating the exhaust from said cylinder.

It is a further object of my invention to provide means for moving by power the valve operating mechanism and to synchronize this power mechanism with the cycle of operation of the motor itself.

Referring to the drawings:

Figure 1 is a vertical section through the valve operating mechanism, case, the governor shaft, gearing, and a portion of the starting mechanism and valve tappet mechanism;

Figure 2 is a view partially in section showing in plan the valve operating mechanism and starting mechanism;

Figure 3 is a plan view of the other end of the valve operating mechanism which is connected to the single shaft appearing in Figures 1 and 2; the mechanism in Figure 3 being used to operate the valve on the other cylinder of the pair of cylinders which are to be operated according to the typical illustration herein illustrated and described;

Figure 4 is an end elevation of the auxiliary exhaust cam;

Figure 5 is a view partially in section of the control valve for controlling the application and exit or return of the air from the starting mechanism;

Figure 6 is an end elevation of the mechanism in Figure 5;

Figure 7 is a side elevation in detail partially in section of the starting mechanism for shifting the auxiliary exhaust cam; and Figure 8 is a plan view of the crank case, of the valve operating mechanism, and the gears for operating the governor and cam shaft;

Figure 9 is an end elevation of the timing disc valve;

Figure 10 is a section on the line 10—10 of Figure 8;

Figure 11 is a detailed view of the manual valve lifting mechanism shown in Fig. 10.

Fig. 12 is a plan view of the tandem motor partially in section, to show the valve actuating gearing.

Fig. 13 is a sectional view through the cylinder head showing the inlet and exhaust valves and starting mechanism in section.

Fig. 14 is a plan view of the complete engine structure showing the cylinder portions and the driving portions.

Figure 15 is a sectional view through the entire length of the engine showing an engine cylinder, a compression cylinder and the related parts.

Figure 18 is a section on the line 18—18 of Figure 6.

Figure 19 is a section on the line 19—19 of Figure 6.

Figures 16, 17:
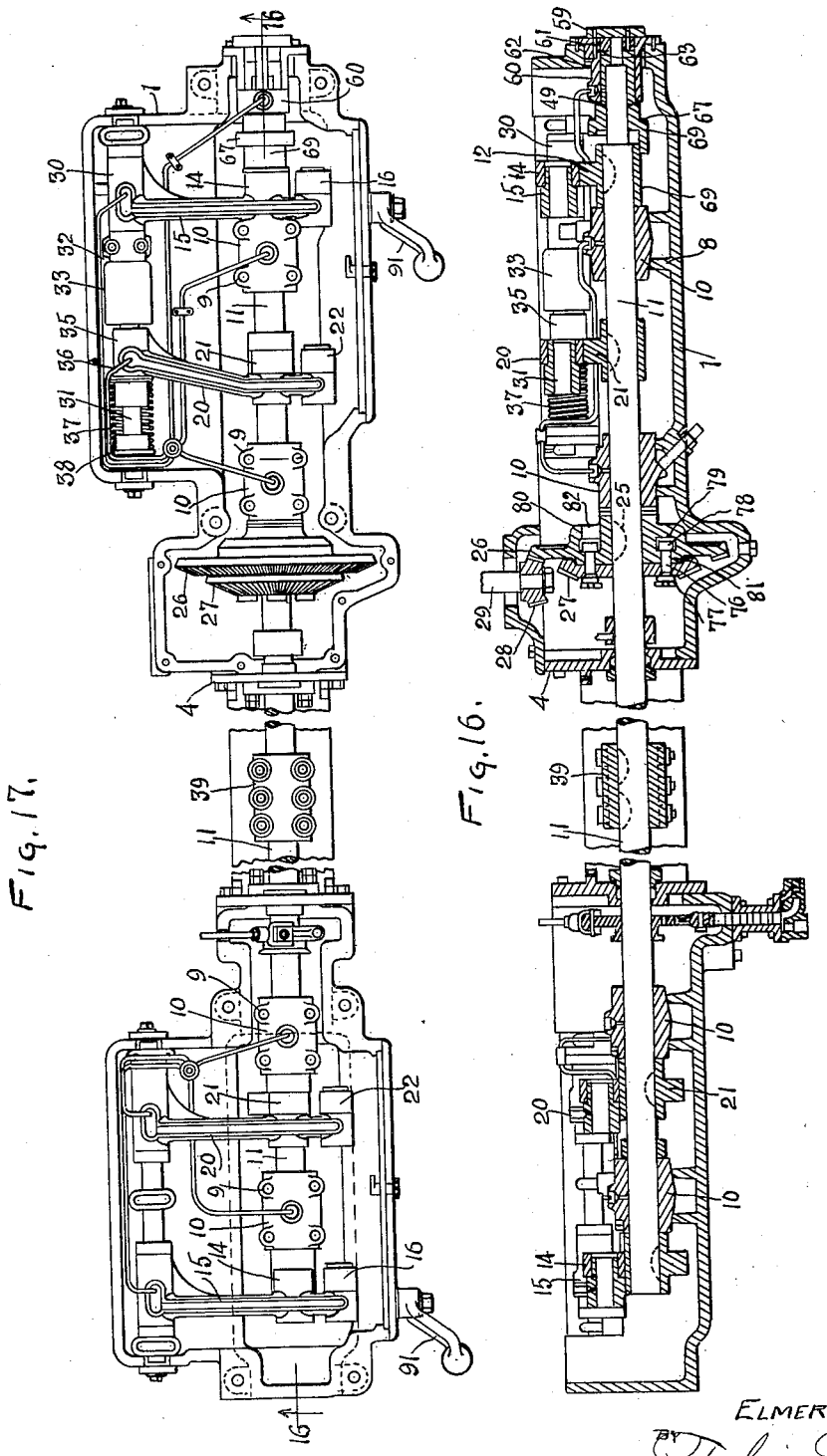
Figure 16 is a sectional view taken on the line 16—16 of Figure 17.
Figure 17 is a view of the camshaft casing with the cover partly removed to show part of the gearing, and means for shifting the intake valve arm.

Referring to the drawings in detail 1 is a casing used for the purpose of enclosing and supporting the valve operating mechanism and governor gearing as well as a portion of the starting mechanism. This casing is attached to the bottom of the valve casing by the bolts 2, the valve casing being designated 3. An end plate 4 is provided which acts not only as a wall to enclose the casing and retain the lubricant 5 therein, but also acts as a support for the shafts. Packing designated 6 is provided for preventing leakage around the cam shaft 11.

The bottom of this case 1 is provided with a series of upstanding bosses 7 on which are mounted the bearing supports 8 which have bolted thereto by the bolts 9, bearings 10. The main cam shaft 11 supported in bearings 10 has a plurality of cams such as 12, 13 for operating the exhaust and inlet valves. The cam 12 for instance operates against a cam roller 14 carried adjacent the end of a rock arm 15 (Figure 10). This arm carries on its end a roller 16 which operates the tappet 17. The elevation of the roller and end of the arm of the cam causes the roller to engage with the tappet 17 of the valve stem 18 of the exhaust valve moving the valve stem in its guiding sleeve 19 in the casing 3.

Turning to the inlet valve there will be seen a similar arm 20 and rollers 21 and 22 (Figures 2, 3 and 8). The roller 22 engages with the tappet 23 for elevating the valve stem 24 of the inlet valve. Mounted on this shaft 11 and keyed thereto by the key 25 is a gear 26 having bolted thereon a second bevelled gear 27. The first mentioned gear meshes with the bevelled pinion 28 on the shaft 29 for operating a governor (not shown).

The lever 15 is mounted on a sleeve 30 carried on a shaft 31 which is supported on this casing 1. The shaft 31 carries a sleeve 32 which has provided in it a cup shaped member 33 through which the shaft extends, and contains between it and the shaft a piston sleeve 34 in sliding engagement with the shaft to act as a piston to move the sleeve 35. This sleeve 34 is integrally formed with the enlarged supporting sleeve 35 which supports the arm 20. On this sleeve 35 which supports the arm 20 is a shoulder 36 against which engages a helical spring 37 which surrounds the shaft 31. This spring abuts at its other end against a fixed shoulder 38 carried on the shaft 31.

The cams and rollers and arms for operating the valves shown in Figure 3 are in every way similar to the valves shown in Figures 1 and 2 with the exception that the valves shown in Figures 1 and 2 are the valves used in connection with the cylinder to which the starter is applied, but for the purpose of distinguishing the parts one from the other the corresponding parts found in Figure 3 are indicated by the primes. 14' is a roller on the rock arm 15' which actuates a roller 16' and operates a tappet. The roller 14' comes in contact with a cam on the cam shaft. The numeral 20' designates an arm similar to that designated by the numeral 20. On this arm is a cam engaging roller 21'. There is also a roller 22' adapted to engage and operate a tappet.

Turning to Figure 3, it will be seen that the central portion of the shaft 11 is supported in a bearing 39 between the cylinders 96 and 97 adjacent to which each of the valve operating mechanisms are located (see Figures 3, 12 and 14). A second casing and valve mechanism is provided in Figure 3 for use with a second cylinder 97 similar to the mechanism already described. It only differs in that it does not have any starting mechanism.

Referring to the starting mechanism, a source of supply of air under pressure is attached to the pipe 40 Figure 2. This pipe is controlled by a valve 41 with a handle 42. The valve 41 is always open while the starter is operating. A pipe 43 connected thereto opens into a chamber 44 in the control motor housing 45 which is closed at one end by a screw plug 46 and is open and has a screw-threaded collar 47 at the other end. The collar 47 is connected to one motor cylinder as shown in Figure 13, there being two of these cylinders, as shown. This open end 47 is closed by a valve 48 on a valve stem 49. This valve stem passes through a guide 50 with a shoulder 51 thereon engaging with one end of the helical spring 52 the other end of which engages against the piston 53 carried on the end of the valve stem. The guide 50 is suitably supported by the housing 45.

It will be noted on examination of Figure 2 that the casing 45 and the space formed thereby is divided into two chambers, 44 and 54, by means of the piston 53. As shown in Figure 2 the piston 53 is in such position that the valve 48 which controls the admission of air into the motor cylinder 96 is closed, and held in this position by means of the spring 52, together with the air pressure in the chamber 44. During the time that the valve 41 is open the air pressure extends from the chamber 44, through the pipe 55, into and through pipe 56 into the chamber indicated by the numeral 57, where it acts against the piston sleeve 34 to move the intake arm 20 so that it is not operated by the rotation of the cams on the camshaft 11. By this means, during the time that the starter is in operation, the intake valve of the cylinder to which the starter is attached is inoperative, and remains inoperative so long as the starter is in operation.

Extending also from pipe 55 there is another pipe 58, which leads through a passageway 61, and through the opening 62 into a space or area designated by the numeral 63, which may be appropriately called the exhaust valve operating chamber. This chamber is formed by the cylinder 60, which has the passage 61 and the opening 62 therein. One end of this cylinder 60 is closed by a plate 59, which has a suitable opening for the reception of the end of pipe 58 for the admission of air into the passageway 61, and another opening to receive the end of pipe 74.

There is slidably mounted in this cylinder 60 a piston member 64, which is actuated by the air pressure admitted into the exhaust valve operating chamber 63. The piston 64 is hollowed out at one end and is adapted to fit over the end of the camshaft 11, as indicated in Figure 2. The extreme outer end of the camshaft 11, beyond that part indicated by the numeral 65, is reduced, as indicated by the numeral 66. The part 66 is adapted to pass through a reduced opening in the end of the piston 64. The piston 64 is adapted to move back and forth on the parts 65 and 66, and to rotate therewith due to the friction between the piston and the cam 67 and to the spline, indicated by the numeral 64′, Figure 1.

The part of the piston 64 remote from the reduced part 66 engages an auxiliary exhaust cam 67. Under normal conditions, when there is no air pressure in the cylinders, the spring 68 tends to hold the piston 64 in extreme righthand position so that the cam 67 is entirely free from the roller 14, which is adapted to be engaged by the cam 67 to operate the exhaust arm 15.

During the time the starter is in operation the cam 67 is pushed to the extreme left, due to pressure in the part 63, so that the roller 14 is periodically engaged by the cam 67. This cam 67, in this position, cooperates with the cam 12 in opening the exhaust operated by the lever 15.

At all times during the operation of the starter the cam 67 is in position to be engaged by the roller 14, but as soon as pressure is removed from the piston 64 the cam 67 moves out of the path of the roller 14, due to the action of spring 68 acting against the abutting member 69.

The foregoing operations are continuous and unshifting during the time that the air pressure is on, but for the purpose of operating the motor to start it there is means for introducing periodically air into the cylinder 96, as shown in Figure 13. This means is the valve mechanism 48, together with means for operating the valve to open and close it.

On the outer end of the reduced part 66 there is fixed a disc member 71 which rotates with the shaft 11, due to the action of a spline member 70. This disc member 71, which might be properly called a valve ring, has certain openings therein for the passage of air from the chamber 63, through the pipe 74, into the chamber 54.

When the pressure of the air operates through the pipe 74 in the chamber 54 the piston 53 is forced to the left to open the valve 48. This is due to the fact that the pressure in the chamber 54 and the pressure on the valve 48 is greater than the combined pressure of the spring 52 and the pressure in the chamber 44 on the part of piston 53. On account of this unbalanced pressure the valve 48 is opened and air, under pressure, is admitted to the motor cylinder 96.

Before this operation takes place the engine is necessarily adjusted in such a way that the pressure admitted through the valve 48 will operate to start this cylinder. When the air is admitted through the valve 48 the exhaust valves are all closed, due to the fact that the cam 12 and the cam 67 are, at that time, in inoperative position during the course of the rotation of the camshaft 11.

The valve ring 71 (Figures 2, 5, 6, 9, 18 and 19) has two openings, 72, therethrough, leading into slots 73 on the outer face thereof, for the admission of air from the chamber 63, through pipe 74 into the chamber 54. The pipe 74 is secured in a suitable hole in 59 and leads to the chamber 54. That is, every half rotation of the shaft 11, when a slot 73 is over the opening leading into pipe 74, air is admitted to the chamber 54.

And intermediate between these two openings or holes 72 and slots 73 there are exhaust openings, indicated by the numeral 75, which open into exhaust port in the plate 59 (Figures 5, 6 and 9). Immediately after the air, under pressure, has been admitted into chamber 54 for the purpose of opening the valve 48, and the admission of air into the motor cylinder, the camshaft rotates to shut off the admission of air into pipe 74, and to bring the exhaust opening 75 over the pipe 74 and the exhaust port 76 in the plate 59 to exhaust the chamber 54 so after each application of air to the chamber 54 there is an exhaust and a release of the pressure so that the valve immediately closes. And succeeding each exhaust from chamber 54 and the closing of valve 48 there is an exhaust from the cylinder, due to the raising of the exhaust arm by cams 12 and 67.

It is obvious from this operation and structure that on each half rotation of the camshaft 11 air is admitted into the chamber 54 to open the valve 48, whereby air under pressure is fed into the cylinder of the motor to operate it, and as soon as the valve 48 admitting air to the cylinder is closed, the cam 67 or 12 comes into play against the roller 14 to open the exhaust port and release the pressure.

As soon as this operation of exhaust has been fully completed pressure is again admitted, through pipe 74, to chamber 54 and again opens the valve 48 to admit air, under pressure, to the cylinder to repeat the operation, which is continued until the second cylinder is started by a combustible charge.

An examination of Figure 14 shows the assembled motor. The figures 96 and 97 are used to represent two different cylinders of the motor, but operated from the same camshaft and driving the same mechanism. The starter, which is the subject-matter of this application, is associated with only one (96)

of the cylinders. In the present instance it is shown in the lower left-hand corner of this Figure 14, as shown by the reference numerals 40 and 45.

The complete mechanism of the starter is shown in Figure 2, and outside of the pipes there are only two connections between the starter and this motor. One is where the valve and valve collar 47 are applied to the cylinder. This is well illustrated in Figure 13. The other part of the connection with the motor is in connection with the camshaft 11, which operates the timing mechanism found in the ring 71, which controls the admission of air into chamber 54 to open the valve 48 and the exhaust of air to close valve 48.

The manner in which air is admitted into the cylinder is thoroughly shown in Figure 13, in connection with Figure 2.

It will be understood that the gear 27 is operated by a gearing shaft connected to the main crank shaft (Figure 12) of the motor so that the entire cam shaft 11 will be operated synchronously with the motor. This timing is accomplished by the setting of the gear 27 on the shaft 11. This result is secured (Figure 1) by the bolts 76' which have the setting nuts 77 on the end thereof. These bolts have heads 78 which travel in a groove 79. This groove is formed in the hub 80 of the gear 26 which drives the governor. The bolts are inserted into these gears through the opening 82 in the hub of the gear 26.

The gear 27 is loosely mounted on the shaft 11 while the gear 26 is keyed thereto by the key 25.

By moving the bolts through the slot 81 which connects with the slot 79 it is possible to rotate the gear 27 with respect to the gear 26 and to clamp it in position by the nuts 77 which serve to engage the gears between themselves and the head 78 of the bolts 76. Thus the exact timing can be secured.

The gear 27 is driven (Figure 12) by a pinion 82' carried on a shaft 83 which is supported at one end in the valve casing and at the other end in a part of the main casing 84 of the engine. On the other end of the shaft 83 is a pinion 85 meshing with a second bevelled pinion 86 carried on a cross-shaft 87 pivoted in the motor frame. This cross shaft has mounted thereon a gear 88 engaging with the gear 89 mounted on the crank shaft 90 of the engine, which has connected thereto piston rods operating in cylinders 96 and 97.

If it should be necessary at any time to exhaust the cylinder independent of the mechanical means, there is provided manually operated means consisting of a handle 91 (Figures 8 and 10) and rock shaft 92 working in a sleeve 93 of the valve mechanism casing. On the end of this rock shaft 92 is a collar 94 with diverging arms 95 for lifting the valve lever when the rock shaft is rotated by the handle 91 and one of these arms is brought in engagement with the lever. This in turn serves to lift the valve itself.

There is shown in Figure 14 a complete plan view of the motor and the associated parts. The cylinders of the motor are indicated by the numerals 96 and 97. 98 and 98a are used to indicate the housing that incloses the mechanism for driving the shaft 90, and by which the shaft 90 drives the compressing mechanism, indicated by the numeral 108, of which the numeral 104 more particularly represents the compression cylinders.

The starting mechanism used in connection with a motor of this type is shown as being associated with one of the cylinders, and is seen in the parts indicated by the numerals 40 and 45. By an observation of this Figure 14 it will be found that the starter is associated with only one of the cylinders of the engine, and when this cylinder is operated by the starter the second cylinder, which is represented by the numeral 97, is started, and after cylinder 97 is started the starter is disconnected and cylinder 96 begins to fire, naturally owing to the operation of cylinder 97.

Figure 15 shows a longitudinal sectional view through one of the cylinders, the crankshaft and one of the compression cylinders. The numeral 99 is used to designate a drive wheel, and is common to the two cylinders and is mounted upon shaft 90.

The numeral 100 is used to designate the connecting rod extending from the crank, indicated by the numeral 101, to a pivot, indicated by the numeral 101'. From this pivot 101' extends the pitman rod which connects to the compressor head, indicated by the numeral 103. The true cylinder of the compressor cylinder is indicated by the numeral 104. 106 and 107 are numerals used to indicate valves on the compression cylinder.

Referring to the engine side of the device shown in Figure 15, 102 is the connecting rod used to connect the crank 101 to a pivot connection 101a, whereby the connecting rod is pivotally connected with the piston rod 102a. 105 is used to indicate a union between the piston rod and the piston 103a. 106a is used to designate the splatter guard. In this Figure 15 is also shown a camshaft 11 and the cam lever 15 for operating the exhaust valve tappet 17.

In Figure 13 there is shown in section the valves used in connection with the motor. 18 is the valve stem for operating the exhaust valve. This valve is shown in connection with the starting mechanism. When the valve 48 is open for the admission of air from the starter into the cylinder the valve 18a is closed, in order that there may be no exhaust at that time from the cylinder. When the valve 48 is closed then the exhaust is open and air passes from the cylinder to the outside and is exhausted. This exhaust operation is controlled by the camshaft 11 and the permanent and auxiliary cams thereon.

During the time of the operation of the starter the intake valves are closed since there is no need of gas at this time, and these valves are held closed by reason of the cam arm 20 being shifted so as to be out of contact with the cam 13, which operates the intake valve.

Having thus fully described my invention, what I claim as new and desire to secure by Letters Patent is:—

1. In an internal combustion motor, inlet and outlet valve mechanism, a camshaft and cams for operating said valve mechanism, a supporting shaft and arms carrying cam rollers, one of said arms being adapted to be shifted laterally on its supporting shaft, yielding means to resist said shifting, a piston carried on said shiftable arm, a cylinder on said shaft supporting the arm, and means for conveying air to said cylinder behind said piston for shifting and rendering the arm inoperative and rendering the inlet valve mechanism inoperative which the arm and its rollers are designed to operate.

2. In an internal combustion motor, inlet and exhaust valves and tappets therefor, a camshaft having cams thereon adapted to operate said valves, means having rollers for engaging with the cams and rollers for engaging with the valve tappets, an auxiliary cam adapted to be interposed in the path of one of said cam rollers and turn with the camshaft, yielding means to maintain said auxiliary cam in inoperative position, a piston mounted on said camshaft adapted to move the auxiliary cam into operative position, a cylinder associated with said auxiliary cam in which said piston operates, and means to convey air behind said piston to move said auxiliary cam.

3. In an internal combustion motor, inlet and exhaust valves and tappets therefor, a camshaft having cams thereon adapted to operate said valves, means having rollers for engaging with the cams and rollers for engaging with the valve tappets, an auxiliary cam adapted to be interposed in the path of one of said cam rollers and to turn with the camshaft, yielding means to maintain said auxiliary cam in inoperative position, a piston mounted on said camshaft adapted to move the auxiliary cam into operative position, a cylinder associated with said camshaft in which said piston operates, means to convey air behind said piston to move said auxiliary cam, a control valve mounted to turn with said camshaft, and a cooperating valve plate stationary with respect to said control valve, whereby the interval of admitting air and exhausting it for operation of the auxiliary cam is determined.

4. In an internal combustion motor having a camshaft and a cylinder, a second cylinder, communicating means adapted to communicate between the interior of the motor cylinder and the second cylinder, a valve closing said communicating means, means for admitting air under pressure to said second cylinder, a piston and piston rod in said second cylinder, yielding means to maintain said piston in a predetermined position, said valve being mounted on one end of said piston rod and said piston on the other end of said piston rod, means for conveying air from one side of the piston to the other to open the valve, said valve and piston being of different areas to form an unbalanced valve construction, a controlling valve means associated with the camshaft of the motor for regulating the application of air to the motor by regulating the passage of air from one side of the piston to the other side and the exhausting of the air from the starter cylinder.

5. In an internal combustion motor having a cylinder, a second cylinder opening into said motor cylinder, valve mechanism, a camshaft for operating said valve mechanism, an arm carrying a camshaft roller and a tappet roller, an auxiliary cam consisting of a sliding member on said camshaft with an overhanging projecting cam portion, yielding means located between said auxiliary cam and a shoulder on the camshaft, a piston on said auxiliary cam working on the camshaft, a cylinder surrounding said piston and said camshaft, means for conveying air behind said piston to shift the auxiliary cam to engage said camshaft roller, means for permitting the exit of air therefrom consisting of a valve member having ports and rotating with said camshaft, and a plate stationarily mounted adjacent thereto having ports for the direction of the air to exhaust and to enter said member.

In testimony whereof, I affix my signature.

ELMER A. WATTS.